United States Patent
Garcia

(10) Patent No.: US 10,641,684 B2
(45) Date of Patent: May 5, 2020

(54) SYSTEM AND METHODS FOR TESTING AN ENGINE

(71) Applicant: Victor Garcia, Weston, FL (US)

(72) Inventor: Victor Garcia, Weston, FL (US)

(73) Assignee: Power Test, Inc., Sussex, WI (US)

(*) Notice: Subject to any disclaimer, the term of this patent is extended or adjusted under 35 U.S.C. 154(b) by 116 days.

(21) Appl. No.: 16/102,660

(22) Filed: Aug. 13, 2018

(65) Prior Publication Data

US 2019/0049340 A1 Feb. 14, 2019

Related U.S. Application Data

(60) Provisional application No. 62/544,555, filed on Aug. 11, 2017.

(51) Int. Cl.
*G01M 15/04* (2006.01)

(52) U.S. Cl.
CPC ................. *G01M 15/044* (2013.01)

(58) Field of Classification Search
CPC .................................................. G01M 15/044
See application file for complete search history.

(56) References Cited

U.S. PATENT DOCUMENTS

| | | | |
|---|---|---|---|
| 2,425,171 A | 12/1944 | Bennett et al. | |
| 2,597,450 A * | 5/1952 | Cline | G01L 3/20 73/862.14 |
| 2,672,953 A * | 3/1954 | Cline | G01L 3/20 188/274 |
| 2,981,099 A * | 4/1961 | Lapp | G01L 3/1485 73/862.14 |
| 3,863,083 A | 1/1975 | Jaeschke | |
| 3,942,363 A * | 3/1976 | Swis | G01L 3/20 73/116.05 |
| 3,977,240 A | 8/1976 | Eichinger et al. | |
| 4,092,855 A | 6/1978 | Kinney | |
| 4,213,332 A * | 7/1980 | Bonomo | G01L 3/20 73/862.14 |
| 4,864,872 A * | 9/1989 | Stahl | G01L 3/20 73/862.14 |
| 4,899,595 A * | 2/1990 | Warsaw | G01L 3/20 188/296 |
| 5,396,811 A * | 3/1995 | Quartarone | G01L 3/20 73/862.14 |
| 6,253,600 B1 * | 7/2001 | Sondey | G01M 15/02 269/17 |
| 6,405,585 B1 | 6/2002 | Hewitt | |
| 8,505,374 B1 | 8/2013 | Arseneau | |

* cited by examiner

*Primary Examiner* — Freddie Kirkland, III

(74) *Attorney, Agent, or Firm* — Acumen Intellectual Property; Michael C. Balaguy

(57) ABSTRACT

A system for testing an engine, the engine including, a drive shaft, and a fluid circulation subsystem, the fluid circulation subsystem having at least one heat exchanger, and a fresh water pump (engine auxiliary water pump). The portable engine test tool can couple to the engine flywheel housing or output shaft of the transmission and can use the fresh water pump of an engine to provide water to an attached or integrated dynamometer and provide braking force to such. In some embodiments the portable engine testing system can use a fresh water supply reservoir.

16 Claims, 5 Drawing Sheets

SYSTEM AND METHODS FOR TESTING AN ENGINE

CROSS REFERENCE TO RELATED APPLICATION

The present application is related to and claims priority to U.S. Provisional Patent Application No. 62/544,555 filed Aug. 11, 2017, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of measuring and testing and more specifically relates to measuring and testing with a dynamometer.

2. Description of Related Art

Large engine manufactories and engine rebuild centers typically have large engine dyno rooms to test and measure new or rebuilt engines performance. Unfortunately, these rooms, and subsequently the dyno tool, can be expensive and isn't practical for every factory or center. A suitable and affordable solution is desired.

U.S. Pat. No. 6,405,585 to Stanley J. Hewitt relates to a portable flywheel test assembly. The described portable flywheel test assembly includes a portable dynamometer including a frame, an axle rotatably mounted on the frame, and a flywheel secured to the axle. An endless loop drive mechanism connects the axle and the output shaft of the engine to be tested. A ring gear drivingly attaches to the axle and an automotive starter connects to the ring gear to start the axle and engine turning. Various position-adjustable mounting pad assemblies can be mounted on the frame to hold different sizes and types of engines. The whole dynamometer can be tipped on end to facilitate testing of engines with vertical output shafts. A caliper brake mounts on the frame and decelerates the flywheel. Other methods of warming up and loading the engine are also disclosed.

BRIEF SUMMARY OF THE INVENTION

In view of the foregoing disadvantages inherent in the known measuring and testing art, the present disclosure provides a novel system and methods for testing an engine. The general purpose of the present disclosure, which will be described subsequently in greater detail, is to provide an efficient and effective portable engine testing system. The portable engine test tool can couple to the engine flywheel housing or output shaft of the transmission and can use the fresh water pump of an engine to provide water to an attached or integrated dynamometer and provide braking force to such. In some embodiments the portable engine testing system can use a fresh water supply reservoir.

A system for testing an engine, said engine including, a drive shaft, and a fluid circulation subsystem, said fluid circulation subsystem having at least one heat exchanger, and a fresh water pump (engine auxiliary water pump) is disclosed herein in a first embodiment. The system for testing an engine includes an engine interface; the engine interface configured to couple to the drive shaft of the engine; a hydraulic dynamometer; the hydraulic dynamometer configured to couple to the engine interface and configured to provide rotational resistance against the drive shaft via the engine interface. The hydraulic dynamometer may include at least one fluid supply port configured to receive a cooled fluid, and at least one fluid exhaust port configured to exhaust a heated fluid; a plumbing subsystem, the plumbing subsystem may include a dynamometer supply valve hydraulically coupled to the at least one fluid supply port of the dynamometer, a hydraulic supply conduit configured to hydraulically couple to the dynamometer supply valve and to a fresh water supply. The dynamometer return valve is configured to hydraulically couple to the at least one fluid exhaust port of the dynamometer, and a hydraulic return conduit is configured to hydraulically couple to the dynamometer return valve and to a fresh water return.

A method of using the system for testing an engine is also disclosed herein. The method of using system for testing an engine may comprise the steps of: providing a system for testing an engine, the engine including, a drive shaft, and a fluid circulation subsystem, the fluid circulation subsystem may have a at least one heat exchanger, and a fresh water pump (engine auxiliary water pump), the system comprising: an engine interface, the engine interface configured to couple to the drive shaft of the engine; a hydraulic dynamometer, the hydraulic dynamometer configured to couple to the engine interface, and configured to provide rotational resistance against the drive shaft via the engine interface, the hydraulic dynamometer may include at least one fluid supply port (configured to receive a cooled fluid, and at least one heat exchanger, and a fresh water pump, the system comprising; a plumbing subsystem, the plumbing subsystem may include a dynamometer supply valve hydraulically coupled to the at least one fluid supply port of the dynamometer, a hydraulic supply conduit configured to hydraulically couple to the dynamometer supply valve and to a fresh water supply, a dynamometer return valve configured to hydraulically couple to the at least one fluid exhaust port of the dynamometer, and a hydraulic return conduit configured to hydraulically couple to the dynamometer return valve and to a fresh water return; coupling the plumbing subsystem to the fluid circulation subsystem; opening valves to allow coolant flow; adjusting a by-pass valve; testing the engine against a dynamometer load; closing valves to stop the flow of coolant; and uncoupling the plumbing subsystem from the fluid circulation subsystem. The method may further may comprise the step of draining the plumbing subsystem.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, system and methods for testing an engine, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a measuring and testing and more particularly to a system and methods for testing an engine as used to improve the effective and efficient measuring and testing of engines with a dynamometer.

Generally, the portable engine testing system properly loads engines safely without the large investment of an engine dynamometer room and is a viable cost-effective solution to the engine rebuild industry. The portable engine testing system can couple either to the engine flywheel housing or to a transmission output shaft via a hydraulic dynamometer and uses the engine-mounted fresh water pump to not only provide water for cooling the engine, but also to be circulated through the dynamometer to provide resistance. The resistance can then be used along with data collected about RPM, fuel consumption, and boost pressure to determine engine performance. The portable engine testing system is unique because it uses the engine mounted cooling pump to circulate the water through the dynamometer and in turn load the engine. A common dynamometer requires an electric motor, pump and pump room to circulate water to the dynamometer.

Figure 1:
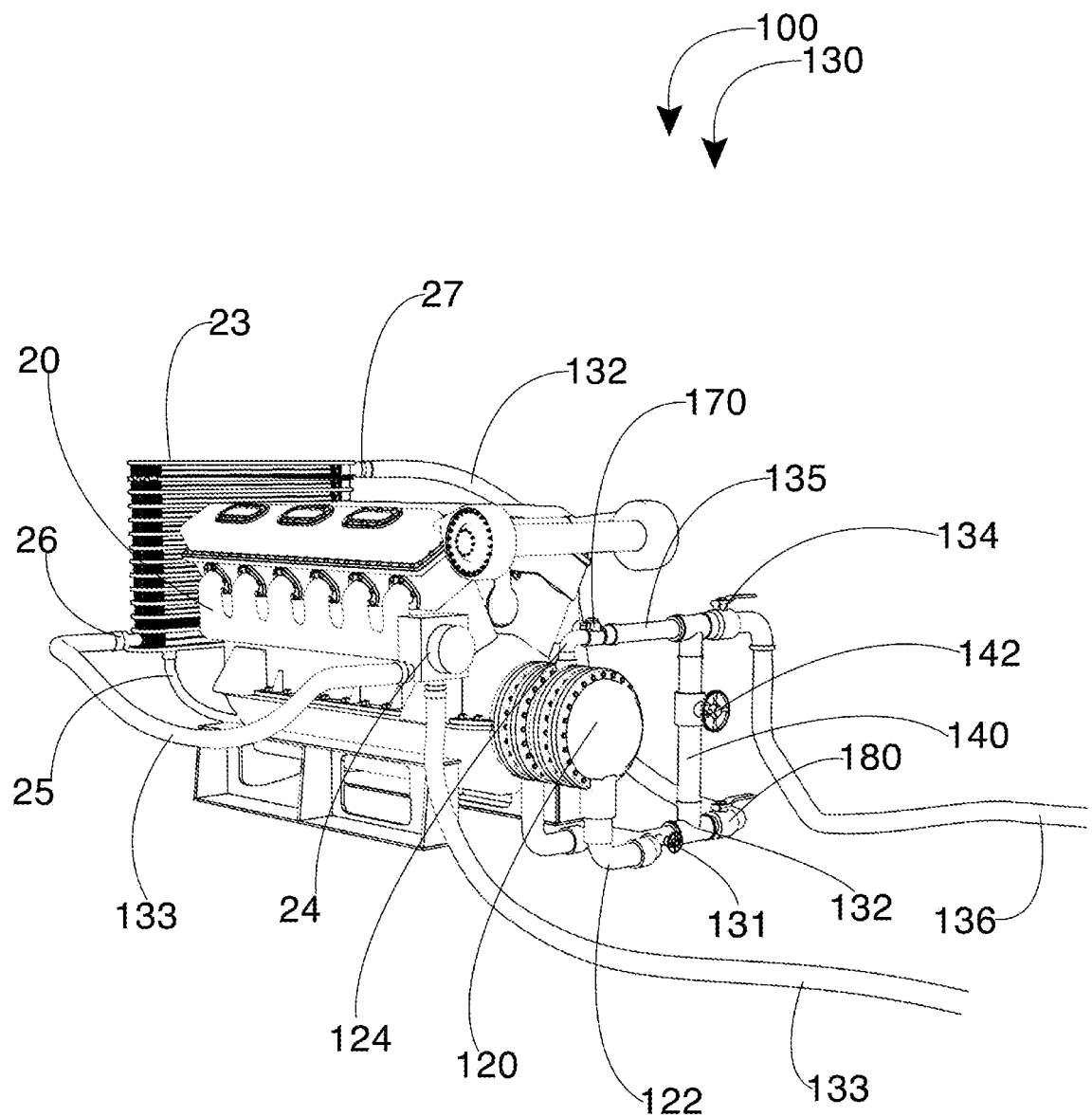
FIG. 1 is a perspective view of the system for testing an engine, said engine including, a drive shaft, and a fluid circulation subsystem, the fluid circulation subsystem having at least one heat exchanger, and a fresh water pump according to an embodiment of the disclosure.
Figure 2:
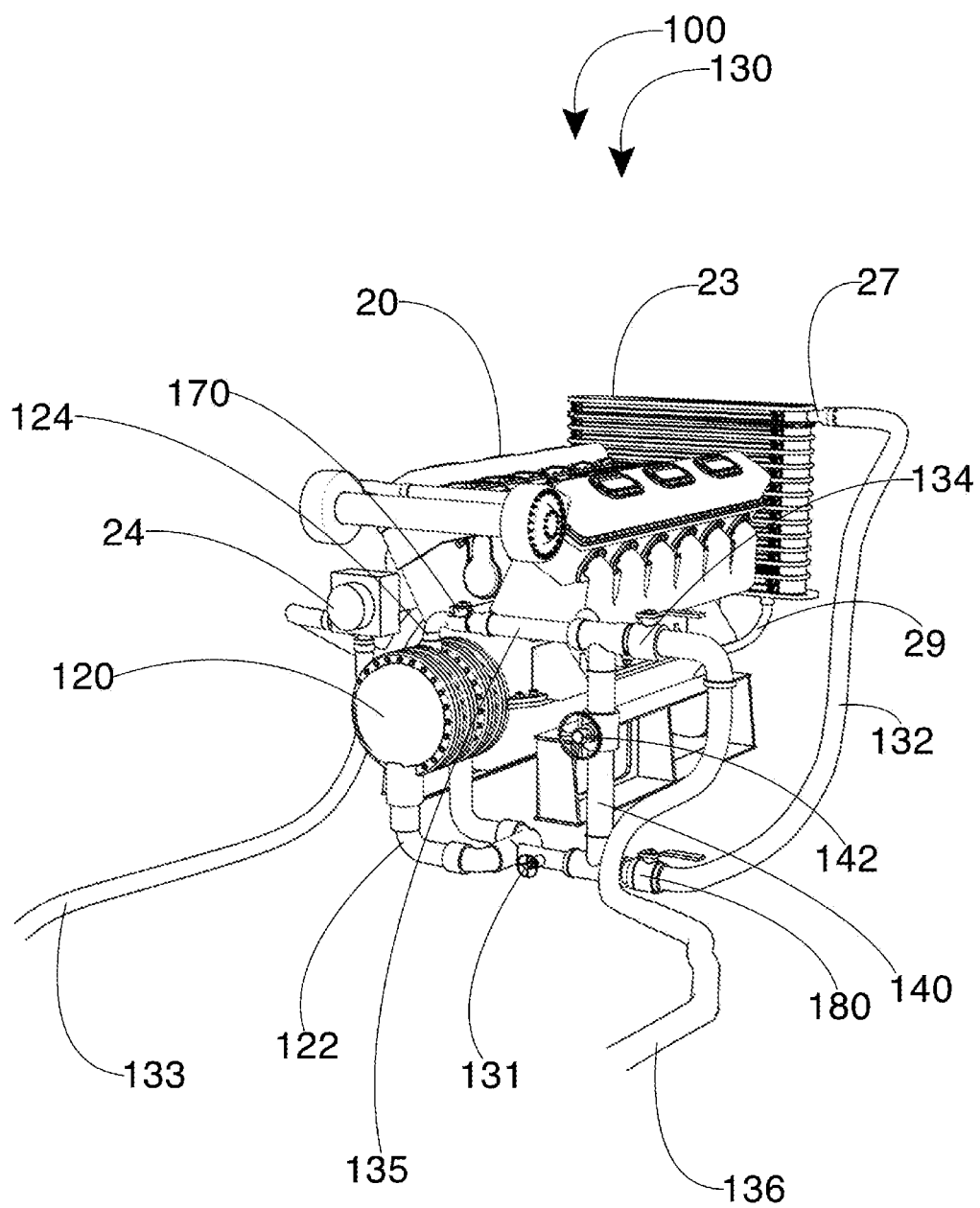
FIG. 2 is a perspective view of the system for testing an engine, the engine including, a drive shaft, and a fluid circulation subsystem, the fluid circulation subsystem having at least one heat exchanger, and a fresh water pump of FIG. 1, according to an embodiment of the present disclosure.

Referring now more specifically to the drawings by numerals of reference, there is shown in FIGS. 1-4, various views of a system for testing an engine 100. FIG. 1 shows a system for testing an engine 100 according to an embodiment of the present disclosure. The engine 20 being tested includes a drive shaft, and a fluid circulation subsystem. The fluid circulation subsystem of the engine 20 includes at least one heat exchanger 23, a fresh water inlet 26, fresh water outlet 27, and a fresh water pump 24. The heat exchanger 23 may include a coolant inlet 25 and a coolant outlet 29 (FIG. 2).

Figure 4:
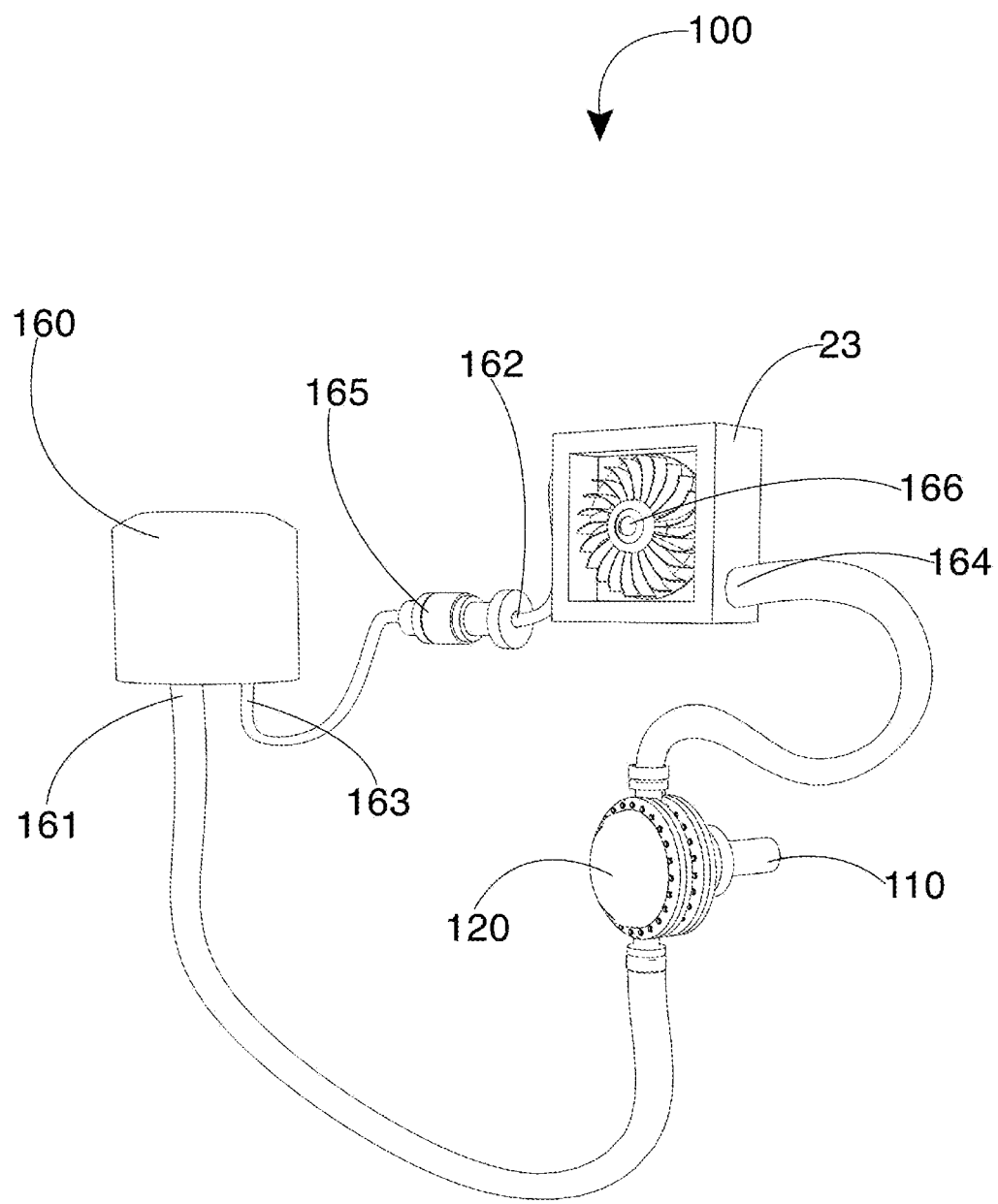
FIG. 4 is a simplified view of the system for testing an engine 100 of FIG. 1, according to an alternate embodiment of the present disclosure.

As illustrated, the system for testing an engine 100 may include an engine interface 110 (FIG. 4) which is able to couple to the flywheel or drive shaft of an engine 20 or alternatively a transmission output of an engine 20. Also included is a hydraulic dynamometer 120 which is coupleable to the engine interface 110 (FIG. 4). The hydraulic dynamometer 120 includes at least one fluid supply port 122 and at least one fluid exhaust port 124 which are used to supply a cooled fluid and exhaust a heated fluid respectively.

The system 100 further includes a plumbing subsystem 130, which includes a fresh water supply 133 which is configured to be coupleable to a fresh water pump 24. The fresh water pump 24 pushes water to the fresh water inlet 26 of the heat exchanger 23. Water then exits the heat exchanger 23 through the fresh water outlet 27 via the continuation of the fresh water supply 133 to a hydraulic supply conduit 132 which includes a fluid shut-off valve 180. The hydraulic supply conduit 132 is coupleable to both a bypass circuit 140 having a bypass valve 142, and to the dynamometer supply valve 131 which is configured to be coupleable to the at least one fluid supply port 122 of the hydraulic dynamometer 120.

The water exits the hydraulic dynamometer 120 via the at least one fluid exhaust port 124. The at least one fluid exhaust port 124 is coupleable to a hydraulic return conduit 135 which includes a one-way check valve 170. The hydraulic return conduit 135 is coupleable to both the bypass circuit 140 and to a dynamometer return valve 134. The dynamometer return valve 134 being coupleable to a fresh water return 136.

According to one embodiment, the system for testing an engine 100 may be arranged as a kit. The kit may include a set of instructions and the system for testing an engine being arranged as a kit. The instructions may detail functional relationships in relation to the structure of the system for testing an engine 100 (such that the system for testing an engine 100 can be used, maintained, or the like, in a preferred manner).

FIG. 2 shows an alternate perspective view of the system for testing an engine 100 of FIG. 1, according to an embodiment of the present disclosure. As above, the system for testing an engine 100 may include a fluid circulation subsystem having at least one heat exchanger 23, the heat exchanger 23 having a coolant inlet 25 (FIG. 1) a coolant outlet 29, a fresh water inlet 26 (FIG. 1), fresh water outlet 27, and a fresh water pump 24. The heat exchanger 23 may be configured to remove heat from engine coolant and comprises a tortuous path configured to receive fresh water and push the fresh water around internal tubes having coolant. The fresh water inlet 26 is hydraulically coupled to and receives fluid from the fresh water pump 24. The fresh water outlet 27 is hydraulically coupled to the hydraulic supply conduit 132. Those with ordinary skill in the art will now appreciate that upon reading this specification and by their understanding the art of testing, connecting, use of heat exchangers, inlet and outlet means as described herein, methods of testing will be understood by those knowledgeable in such art.

The system for testing an engine 100 also includes a plumbing subsystem 130. The plumbing subsystem 130 includes a dynamometer supply valve 131 which is hydraulically coupled to the at least one fluid supply port 122 of the hydraulic dynamometer 120. The dynamometer supply valve 131 also includes a T-fitting and is hydraulically coupled to more than one fluid supply port 122 of the hydraulic dynamometer 120.

The plumbing subsystem 130 also includes a hydraulic supply conduit 132, a fresh water supply 133. A dynamometer return valve 134 is hydraulically coupled to the at least one fluid exhaust port 124 of the hydraulic dynamometer 120.

The plumbing subsystem 130 further includes a hydraulic return conduit 135 which is hydraulically coupled to a one-way check valve 170, a dynamometer return valve 134 and to a fresh water return 136. Additionally, the plumbing subsystem 130 includes a bypass circuit 140. The bypass circuit 140 includes a bypass valve 142 which is configured to hydraulically couple to the hydraulic supply conduit 132 and to the hydraulic return conduit 135.

Figure 3:
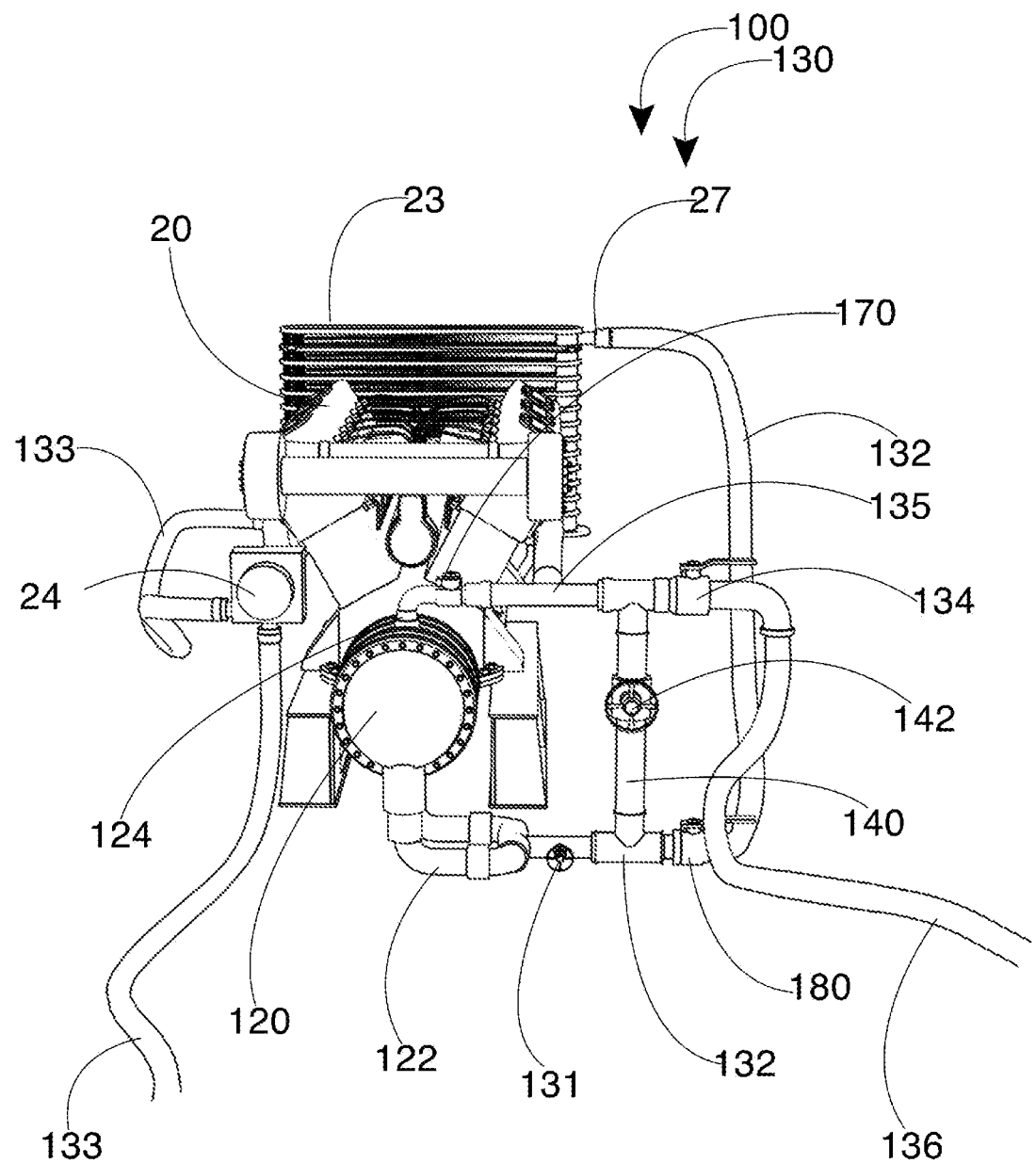
FIG. 3 is a front view of the system for testing an engine, the engine including, a drive shaft, and a fluid circulation subsystem, the fluid circulation subsystem having at least one heat exchanger, and a fresh water pump of FIG. 1, according to an embodiment of the present disclosure.

FIG. 3 shows a front view of the system for testing an engine 100 of FIG. 1, according to an embodiment of the present disclosure. As above, the system for testing an engine 100 may include an engine interface 110, a hydraulic dynamometer 120, a plumbing subsystem 130, a bypass circuit 140, a one-way check valve 170, and a fluid shut-off valve 180. The dynamometer supply valve 131 and the bypass valve 142 of the plumbing subsystem 130 being flow adjustable.

FIG. 4 shows a simplified view of the system for testing an engine 100 of FIG. 1, according to an alternate embodiment of the present disclosure. The system for testing an engine 100 may include a fluid circulation subsystem. The fluid circulation subsystem includes a coolant reservoir 160. The coolant reservoir 160 is hydraulically coupled to a coolant outlet 163 which is in turn hydraulically coupled to a coolant pump 165 and on to a heated fluid inlet 162. The heated fluid inlet 162 is hydraulically coupled to a heat exchanger 23.

The heat exchanger 23 in this particular embodiment is configured to remove heat from fluid and includes a cooling fan 166 and a cooled fluid outlet 164. The cooled fluid outlet 164 is hydraulically coupled to a hydraulic dynamometer 120 via an at least one fluid supply port which is configured to receive a cooled fluid. The hydraulic dynamometer 120 is configured to couple to an engine interface 110 and further configured to provide rotational resistance against the drive shaft of an engine 20 via the engine interface 110. The hydraulic dynamometer 120 is further hydraulically coupled to a fluid return port configured to return a heated fluid to the coolant inlet 161 which is in turn hydraulically coupled to the coolant reservoir 160. This embodiment represents a stand-alone system.

As above and shown in FIGS. 1-3, the system for testing an engine 100 may include a plumbing subsystem 130, a bypass circuit 140, a one-way check valve 170, and a fluid shut-off valve 180. The bypass circuit 140 includes bypass valve 142 hydraulically coupled to the hydraulic supply conduit 132 and the hydraulic return conduit 135. The hydraulic return conduit 135 is hydraulically coupled to the dynamometer return valve 134 and the coolant return, and is configured to return coolant to the coolant reservoir 160.

Figure 5:
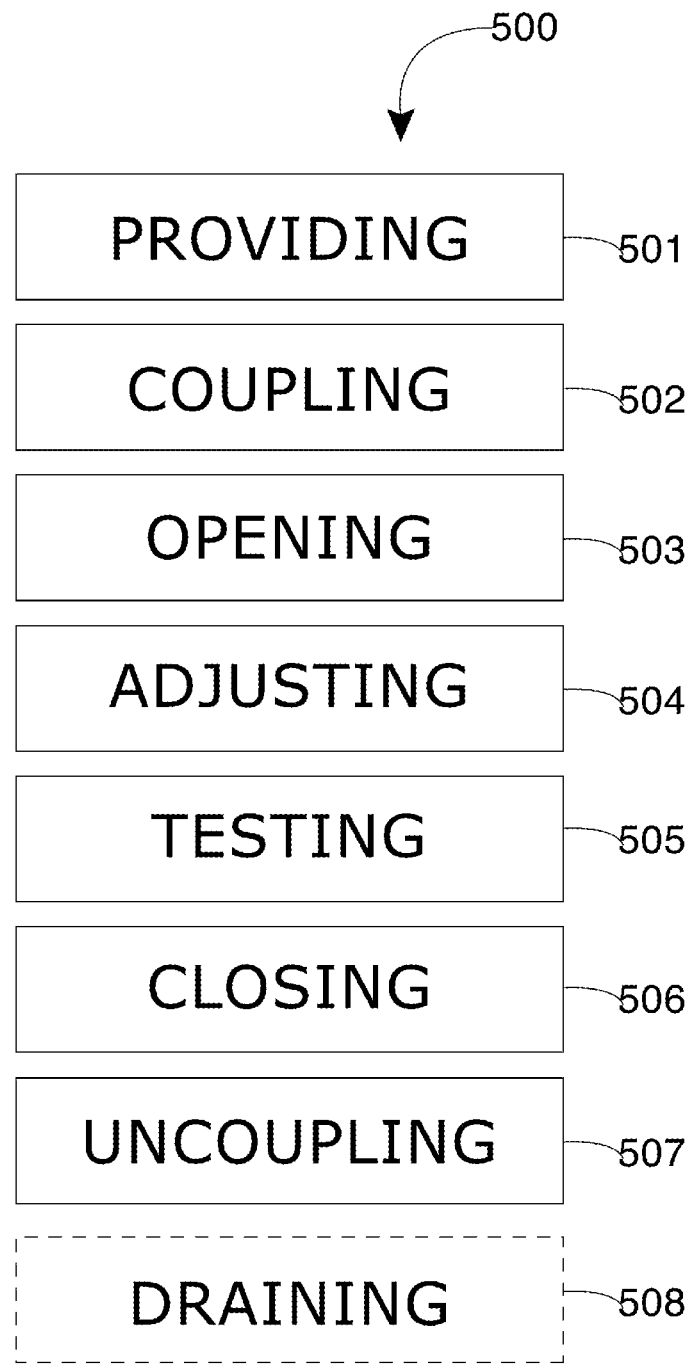
FIG. 5 is a flow diagram illustrating a method of use for the system for testing an engine, according to an embodiment of the present disclosure.

FIG. 5 is a flow diagram 550 illustrating a method for testing an engine 500, according to an embodiment of the present disclosure. As illustrated, the method for testing an engine 500 may include the steps of: providing 501 a system for testing an engine 100, the system comprising: an engine interface 110 configured to couple to the drive shaft of the engine; a hydraulic dynamometer 120 configured to couple to the engine interface 110 and configured to provide rotational resistance against the drive shaft via the engine interface 110. The system 100 further includes a plumbing subsystem 130 which may include a dynamometer supply valve 131 hydraulically coupled to the at least one fluid supply port 122 of the dynamometer, a hydraulic supply conduit 132 configured to hydraulically couple to the dynamometer supply valve 131 and to a fresh water supply 133, a dynamometer return valve 134 configured to hydraulically couple to the at least one fluid exhaust port 124 of the dynamometer, and a hydraulic return conduit 135 configured to hydraulically couple to the dynamometer return valve 134 and to a fresh water return 136; coupling 502 the plumbing subsystem 130 to the fluid circulation subsystem; opening 503 valves to allow coolant flow; adjusting 504 bypass valve 142; testing 505 the engine 20 against a dynamometer load; closing 506 valves to stop the flow of coolant; and uncoupling 507 the plumbing subsystem 130 from the fluid circulation subsystem. The method may further may comprise the step of draining 508 the plumbing subsystem 130.

It should be noted that step 508 is an optional step and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for the system for testing an engine 100 (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A system for testing an engine, said engine including, a drive shaft, and a fluid circulation subsystem, said fluid circulation subsystem having at least one heat exchanger, and a fresh water pump comprising:
   - an engine interface, said engine interface configured to couple to the drive shaft of the engine;
   - a hydraulic dynamometer, the hydraulic dynamometer configured to couple to the engine interface, and configured to provide rotational resistance against the drive shaft via the engine interface, the hydraulic dynamometer including
     - at least one fluid supply port configured to receive a cooled fluid, and
     - at least one fluid exhaust port configured to exhaust a heated fluid;
   - a plumbing subsystem, said plumbing subsystem including a dynamometer supply valve hydraulically coupled to the at least one fluid supply port of the dynamometer,
a hydraulic supply conduit configured to hydraulically couple to the dynamometer supply valve and to a fresh water supply,
a dynamometer return valve configured to hydraulically couple to the at least one fluid exhaust port of the dynamometer, and
a hydraulic return conduit configured to hydraulically couple to the dynamometer return valve and to a fresh water return;
wherein the plumbing subsystem further comprises a bypass circuit including:
a bypass valve configured to hydraulically couple to the hydraulic supply conduit and to the hydraulic return conduit.

2. The system for testing an engine of claim 1, wherein the heat exchanger is configured to remove heat from engine coolant, the heat exchanger including
a coolant inlet, a coolant outlet, a fresh water inlet, and a fresh water outlet.

3. The system for testing an engine of claim 2, wherein the fresh water inlet is configured to hydraulically couple to and receive fluid from the fresh water pump.

4. The system for testing an engine of claim 2, wherein a fresh water outlet is configured to hydraulically couple to the hydraulic supply conduit.

5. The system for testing an engine of claim 2, wherein the heat exchanger comprises a tortuous path configured to receive fresh water and push said fresh water around internal tubes having said engine coolant.

6. The system for testing an engine of claim 1, wherein the dynamometer supply valve includes a T-fitting and is hydraulically coupled to more than one fluid supply port of the dynamometer.

7. The system for testing an engine of claim 1, wherein the hydraulic return conduit includes a one-way check valve.

8. The system for testing an engine of claim 1, wherein the hydraulic supply conduit includes a fluid shut-off valve.

9. The system for testing an engine of claim 1, wherein the dynamometer supply valve is configured to be flow adjustable.

10. The system for testing an engine of claim 1, wherein the bypass valve is configured to be flow adjustable.

11. A system for testing an engine, said engine including, a drive shaft, the system comprising:
a fluid circulation subsystem, said fluid circulation subsystem having a coolant reservoir, a coolant inlet, a coolant outlet, coolant pump;
an engine interface, said engine interface configured to couple to the drive shaft of the engine;
a hydraulic dynamometer, the hydraulic dynamometer configured to couple to the engine interface, and configured to provide rotational resistance against the drive shaft via the engine interface, the hydraulic dynamometer including
at least one fluid supply port configured to receive a cooled fluid, and
at least one fluid return port configured to return a heated fluid;
a plumbing subsystem, said plumbing subsystem including
a dynamometer supply valve hydraulically coupled to the at least one fluid supply port of the dynamometer,
a hydraulic supply conduit configured to hydraulically couple to the dynamometer supply valve and to a coolant supply,
a dynamometer return valve configured to hydraulically couple to the at least one fluid return port of the dynamometer,
a hydraulic return conduit configured to hydraulically couple to the dynamometer return valve and to a coolant return;
wherein said system for testing an engine is a stand-alone-system; and
wherein the plumbing subsystem further comprises a bypass circuit including:
a bypass valve configured to hydraulically couple to the hydraulic supply conduit and to the hydraulic return conduit.

12. The system for testing an engine of claim 11, wherein the plumbing subsystem further comprises a heat exchanger, said heat exchanger configured to remove heat from fluid, the heat exchanger including a heated fluid inlet, a cooled fluid outlet, and a cooling fan.

13. The system for testing an engine of claim 11, wherein the coolant reservoir is configured to be hydraulically coupled to the coolant pump and configured to be in fluid communication with the plumbing subsystem including the hydraulic return conduit, the dynamometer return valve, and the coolant return.

14. The system for testing an engine of claim 13, wherein the hydraulic return conduit is configured to hydraulically couple to the dynamometer return valve and the coolant return and is configured to return coolant to the coolant reservoir.

15. A system for testing an engine, said engine including, a drive shaft, and a fluid circulation subsystem, said fluid circulation subsystem having at least one heat exchanger, and a fresh water pump, the system for testing an engine comprising:
an engine interface, said engine interface configured to couple to the drive shaft of the engine;
a hydraulic dynamometer, the hydraulic dynamometer configured to couple to the engine interface, and configured to provide rotational resistance against the drive shaft via the engine interface, the hydraulic dynamometer including
at least one fluid supply port configured to receive a cooled fluid, and
at least one fluid exhaust port configured to exhaust a heated fluid;
a plumbing subsystem, said plumbing subsystem including
a dynamometer supply valve hydraulically coupled to the at least one fluid supply port of the dynamometer,
a hydraulic supply conduit configured to hydraulically couple to the dynamometer supply valve and to a fresh water supply,
a dynamometer return valve configured to hydraulically couple to the at least one fluid exhaust port of the dynamometer, and
a hydraulic return conduit configured to hydraulically couple to the dynamometer return valve and to a fresh water return; and
wherein the plumbing subsystem further comprises a bypass circuit including:
a bypass valve configured to hydraulically couple to the hydraulic supply conduit and to the hydraulic return conduit;
wherein the plumbing subsystem further comprises a heat exchanger, the heat exchanger is configured to remove heat from engine coolant, the heat exchanger including a coolant inlet, a coolant outlet, a fresh water inlet, and a fresh water outlet;

wherein the fresh water inlet is configured to hydraulically couple to and receive fluid from the fresh water pump;

wherein the fresh water outlet is configured to hydraulically couple to the hydraulic supply conduit;

wherein the heat exchanger comprises a tortuous path configured to receive fresh water and push said fresh water around internal tubes having said engine coolant;

wherein the dynamometer supply valve includes a T-fitting and is hydraulically coupled to more than one fluid supply port of the dynamometer;

wherein the hydraulic return conduit includes a one-way check valve;

wherein the hydraulic supply conduit includes a fluid shut-off valve;

wherein the dynamometer supply valve is configured to be flow adjustable; and wherein the bypass valve is configured to be flow adjustable.

16. The system for testing an engine of claim 15, further comprising a set of instructions; and wherein the system for testing an engine, said engine including, a drive shaft, and a fluid circulation subsystem, said fluid circulation subsystem having at least one heat exchanger, and a fresh water pump is arranged as a kit.

* * * * *